United States Patent [19]

Carlsson et al.

[11] Patent Number: 4,674,924
[45] Date of Patent: Jun. 23, 1987

[54] SINGLE-SIDED CUTTING INSERT

[75] Inventors: Stiv E. I. Carlsson, Tierp; Lars-Erik Gustafsson, Sandviken; Karl T. W. Robertsson, Gimo, all of Sweden

[73] Assignee: Santrade Ltd., Lucerne, Switzerland

[21] Appl. No.: 782,729

[22] Filed: Oct. 1, 1985

[30] Foreign Application Priority Data

Oct. 10, 1984 [SE] Sweden ................................ 8405059

[51] Int. Cl.⁴ ............................................ B23B 27/16
[52] U.S. Cl. ................................... 407/114; 10/101 R
[58] Field of Search ............................. 407/113–116; 408/226, 713, 224; 10/101 R

[56] References Cited

U.S. PATENT DOCUMENTS 3,813,746  6/1974  Price .................................. 407/114
4,281,430  8/1981  Hellnick ............................. 407/113
4,409,868 10/1983  Huddle et al. ..................... 407/114
4,505,626  3/1985  Benhase ............................. 408/224

FOREIGN PATENT DOCUMENTS 2510960  9/1976  Fed. Rep. of Germany ...... 407/113
1567004  5/1980  United Kingdom ............... 407/113

Primary Examiner—Lowell A. Larson
Assistant Examiner—Jerry Kearns
Attorney, Agent, or Firm—Burns, Doane, Swecker & Mathis

[57] ABSTRACT

A single-sided cutting insert preferably for thread chasing, the lower face of which comprises three support surfaces inclining towards the center of the lower face and a recess separating them. The support surfaces are projecting partly around the recess and therefore the cutting insert at insertion against a base surface of a cutting insert site in a tool shank abuts only against the planar base surface in three separated points.

11 Claims, 7 Drawing Figures

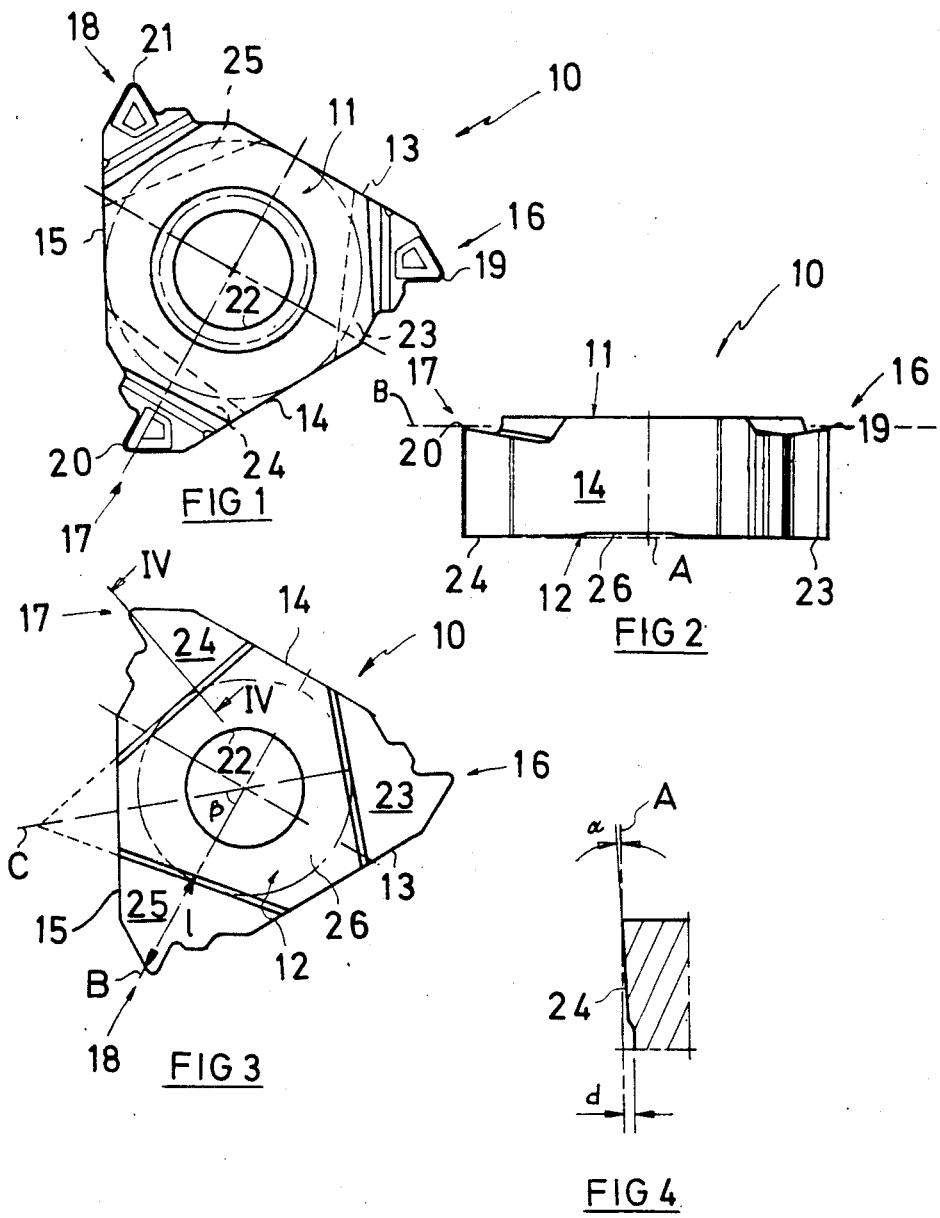

SINGLE-SIDED CUTTING INSERT

BACKGROUND AND OBJECTS OF THE INVENTION

The present invention relates to a single-sided cutting insert preferably for turning which consists of a wafer having a polygonal basic shape, preferably a triangular basic shape. The cutting insert comprises an upper face, a lower face and a plurality of side surfaces joining said faces. The faces are parallel. The side surfaces join each other at corners. Cutting edges are formed along lines at the upper part of said corner. The cutting edges are joined in cutting tips having a mutual plane. The lower face is provided only to abut a base surface of a cutting insert site. Each lower part of the corners comprises a projection connected to two side surfaces.

Hitherto known cutting inserts for turning are abutting the cutting insert site of the tool shank with planar lower faces. The drawback with this type of abutment is the wobble-tendencies that arise due to difficulties in forming completely planar contact surfaces. Thus the cutting insert risks riding upon a point in the middle of the base surface. Furthermore these surfaces can easily be contaminated such that the cutting insert will be caused further instability, which negatively influences the result of the machining.

The object of the present invention is to design the lower face of a cutting insert such that the above-mentioned and other problems are solved.

THE DRAWINGS

The invention will be more closely described in the following in connection to the drawings wherein:

FIG. 1 shows a thread cutting insert according to the invention in a top view.

FIG. 2 shows a thread cutting insert according to FIG. 1 in a side view.

FIG. 3 shows the lower face of the thread cutting insert in a plane view.

FIG. 4 shows a cross-section of the thread cutting insert according to the line IV—IV in FIG. 3.

DETAILED DESCRIPTION OF PREFERRED EMBODIMENTS OF THE INVENTION

Figure 5:
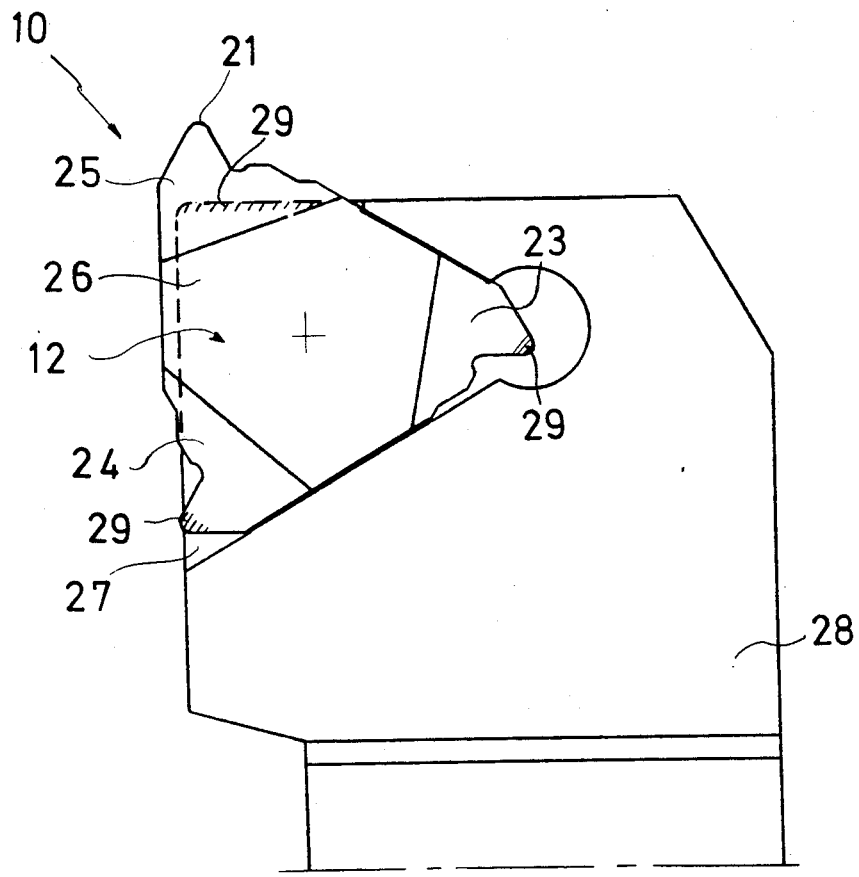
FIG. 5 shows the thread cutting insert positioned in a cutting insert site in a tool shank in a top view.

In FIGS. 1-4 is shown a thread cutting insert 10 which consists of a wafer having triangular basic shape, preferably consisting of a hard metal. The cutting insert 10 comprises an upper face 11 and a lower face 12 mainly parallel thereto. The upper and the lower faces 11, 12 are perpendicularly connected by side surfaces 13,14,15. The cutting insert 10 is provided with three identical cutting corners 16,17,18. Each cutting corner is arranged with a cutting tip 19,20,21 which, shall engage with and cut threads in, a work piece. The cutting tips 19-21 are arranged in a mutual plane B. The cutting insert 10 is provided with a centrally placed securing hole 22 to receive a lock screw for mounting to a cutting insert site of a tool shank. The cutting insert 10 has more closely been described in EP-A1-0119175, which is hereby incorporated in the description, which is referred to for detailed information concerning the shape and the cutting characteristics of the upper face of the cutting insert.

The lower face 12 of the cutting insert 10 lacks cutting edges and therefore it is intended for abutment against the base surface of the cutting insert site only. The lower face 12 comprises three projecting support surfaces 23,24,25 which are separated by a central recess 26. The recess 26 terminates in the radial direction of the cutting insert in an area at the middle of each side surface 13-15. The border lines of the recess 26 form a truncated triangle or a hexagon which is tilted an angle $\beta$ relative to the triangular basic form of the cutting insert. The angle $\beta$ may be chosen to 45° and is defined as the angle between the bisectors of the two triangles B, C.

Figure 6:
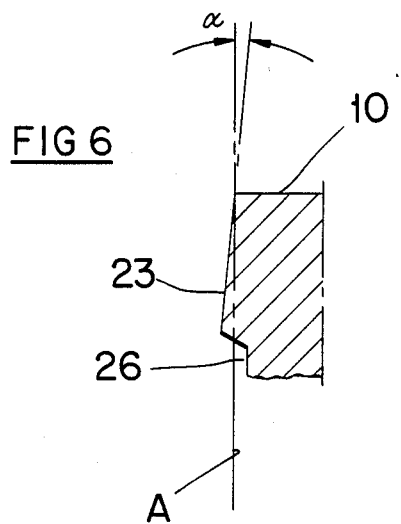
FIG. 6 is a cross-section similar to FIG. 5 of a further embodiment of the invention.
Figure 7:
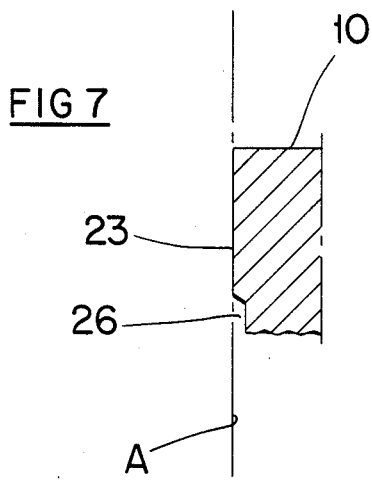
FIG. 7 is a cross-section similar to FIG. 4 of yet another embodiment of the invention.

Each support surface 23-25 inclines inwardly from respective corners of the insert towards the center of the lower face and forms an acute angle $\alpha$ with the plane A, which touches and is thus common to the parts of the support surfaces that are arranged furthest away from the upper face 11. Those parts constitute abutments adapted to rest upon the base surface of a holder. The angle $\alpha$ is preferably chosen less than 1°. Alternatively the angle $\alpha$ may assume neutral (0°) (FIG. 7) or negative values (max $-1$°, see FIG. 6). At a negative acute angle $\alpha$ contact is achieved between the cutting insert and the cutting insert site closer to the center of the cutting insert. The depth d of the recess 26 is defined as the distance between said plane A and the recess 26. The depth d is preferably less than 2 mm. The support surfaces 23-25 are planarly or concavely shaped while the shape of their radially inner ends are of subordinate importance. These may however be shaped both straight or non-straight. The length l of each support surface 23-25 in the radial direction of the cutting insert is 25 to 75% of the radius of the cutting insert, preferably 40 to 60%. The radius of the cutting insert is defined as the distance between the center of the insert and the cutting tip.

FIG. 5 shows the abutment of the lower face 12 against a cutting insert site arranged in a tool shank 28 in a top view. Only the lower face 12 of the cutting insert is shown for reasons of clearness. The contact places 29 between the lower face 12 and the base surface 27 of the cutting insert site on the shank 28 have been hatched. The contact place of the active cutting corner is line-shaped and the passive corners have point-shaped contact places. The contact places may alternatively be larger when having support surfaces with neutral $\alpha$-value, while concave support surfaces achieves point-shaped contact places. A cutting tip 21 has been exposed outside the cutting insert site shim for engagement with the work piece for forming of threads.

A rectangular cutting insert may alternatively be provided with projecting support surfaces on the lower face. The border lines of the recess will then form an octagon whose position is defined by an imaginary square whose bisector is tilted about 45 degrees to an adjacent bisector of the cutting insert.

Thus the invention relates to a cutting insert whose lower face is shaped such that the cutting insert is imparted well-defined abutment surfaces for abutment against the base surface of the cutting insert site and therefore the clamping of the cutting insert becomes stable and wobble-free. Furthermore the recess contributes to some saving of hard material. The shaping of the lower face may also be used at cutting inserts for drilling or milling.

We claim:

1. A cutting insert comprising a polygonally shaped water defining a plurality of corners, said wafer including upper and lower faces interconnected by a plurality of side surfaces, pairs of said side surfaces joining one another at each of said corners, the intersection of said side surfaces and said upper face along sections of said corners forming cutting edge means which define cutting tips lying in a common first plane, the intersection of said side surfaces and said lower face along said corners forming non-cutting edges whereby said insert constitutes a single-sided cutting insert with said lower face to be arranged upon a base surface of a holder, said lower face comprising lower surfaces of said corners, at least a portion of each of said lower surfaces lying in a common second plane and defining abutment means for resting on the base surface of the holder, said coplanar portions being spaced from one another, the area of said lower face situated inside and between said coplanar portions being recessed from said second plane toward said first plane.

2. A cutting insert according to claim 1, wherein each of said lower surfaces extends toward said recessed portion at an inclination toward said first plane to form an acute angle with said second plane.

3. A cutting insert according to claim 1, wherein each of said lower surfaces extends toward said recessed portion at an inclination away from said first plane to form an acute angle with said second plane.

4. A cutting insert according to claim 1, wherein said second plane is parallel to said first plane.

5. A cutting insert according to claim 1, wherein each of said lower surfaces is planar.

6. A cutting insert according to claim 1, wherein each of said lower surfaces is concave.

7. A cutting insert according to claim 1, wherein said wafer is of generally triangular configuration, said recessed portion is shaped as a truncated triangle and defined corners which are angularly offset by an acute angle from the triangular shape of said wafer.

8. A cutting insert according to claim 1, including a hole formed centrally in said wafer perpendicularly through said upper and lower faces.

9. A cutting insert according to claim 1, wherein said insert comprises a thread-cutting insert of generally triangular shape, there being three said corners, said lower surfaces being planar and each forming an acute angle with said second plane wherein a portion of each lower surface located near said recessed portion is situated closer to said first axis than is a portion of said such surface located near an outer periphery of said wafer, each of said lower surfaces having a radial length which is in the range of from 25 to 75% of the radius of the cutting insert.

10. A cutting insert according to claim 9, wherein said range is from 40 to 60%.

11. A cutting insert according to claim 1, wherein said wafer is of generally triangular shape and defines three said corners and three said coplanar portions.

* * * * *